United States Patent
Chesson

(10) Patent No.: US 8,730,808 B2
(45) Date of Patent: May 20, 2014

(54) AGGREGATE TRANSPORT CONTROL

(71) Applicant: Google Inc., Mountain View, CA (US)

(72) Inventor: Gregory L. Chesson, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/676,395

(22) Filed: Nov. 14, 2012

(65) Prior Publication Data

US 2013/0212280 A1    Aug. 15, 2013

Related U.S. Application Data

(62) Division of application No. 12/492,363, filed on Jun. 26, 2009, now Pat. No. 8,339,957.

(51) Int. Cl.
*G01R 31/08* (2006.01)

(52) U.S. Cl.
USPC ........... 370/232; 370/230; 370/235; 370/252; 370/395.4

(58) Field of Classification Search
None
See application file for complete search history.

(56) References Cited

U.S. PATENT DOCUMENTS

| | | | |
|---|---|---|---|
| 4,677,616 A | 6/1987 | Franklin | |
| 4,769,810 A | 9/1988 | Eckberg et al. | |
| 5,014,265 A | 5/1991 | Hahne et al. | |
| 5,426,635 A | 6/1995 | Mitra et al. | |
| 6,047,322 A | 4/2000 | Vaid et al. | |
| 7,564,852 B2 | 7/2009 | Das et al. | |
| 8,339,957 B2 | 12/2012 | Chesson | |
| 2005/0105466 A1* | 5/2005 | Chase et al. | 370/230 |
| 2006/0153564 A1* | 7/2006 | Ryu et al. | 398/69 |
| 2006/0268704 A1 | 11/2006 | Ansari et al. | |
| 2009/0213874 A1 | 8/2009 | Levit | |
| 2010/0067913 A1 | 3/2010 | Niibe et al. | |
| 2010/0329114 A1 | 12/2010 | Chesson | |

OTHER PUBLICATIONS

Restriction Requirement for U.S. Appl. No. 12/492,363, mailed Nov. 30, 2011, 5 pages.
Non-Final Office Action for U.S. Appl. No. 12/492,363, mailed Apr. 25, 2012, 16 pages.
Non-Final Office Action Response for U.S. Appl. No. 12/492,363, mailed Jul. 25, 2012, 17 pages.
Notice of Allowance for U.S. Appl. No. 12/492,363, mailed Aug. 14, 2012, 7 pages.

\* cited by examiner

*Primary Examiner* — Kibrom T Hailu
(74) *Attorney, Agent, or Firm* — Brake Hughes Bellermann LLP

(57) ABSTRACT

Example embodiments of methods and apparatus for data communication are disclosed. An example method includes establishing, at a data network communication device, respective data communication channels with a plurality of client network devices. The example method also includes allocating default size data transmission windows to the plurality of client network devices, monitoring use of the default size data transmission windows by the client network devices based on received data queued in a shared data buffer, allocating fixed size data transmission windows to client network devices of the plurality that are communicating data at a rate greater than a threshold data rate, the fixed size windows being larger than the default size windows. The example method also includes receiving data from the client network devices in accordance with at least one of the default size data transmission windows and the fixed size data transmission windows.

15 Claims, 7 Drawing Sheets

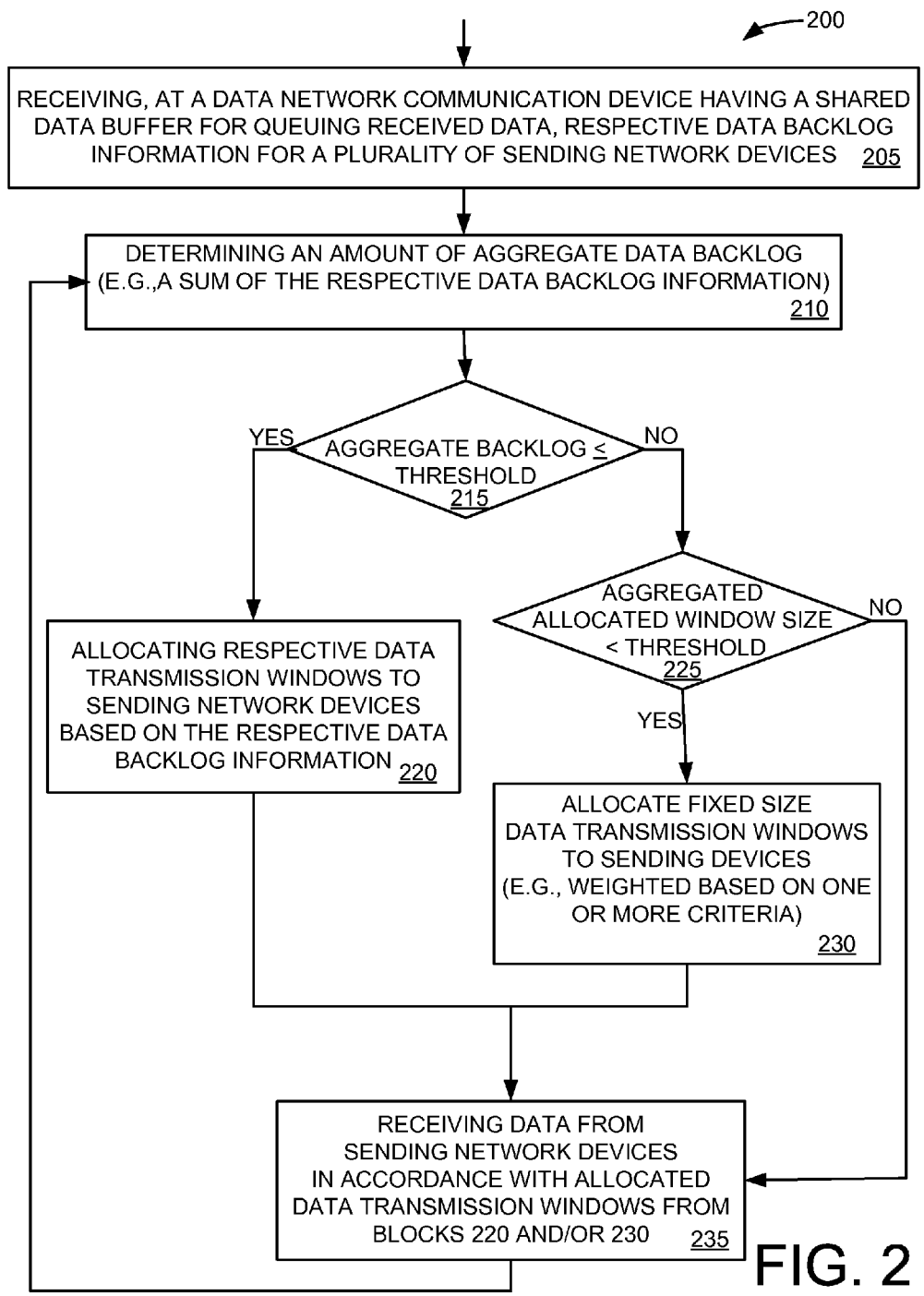

AGGREGATE TRANSPORT CONTROL

CROSS-REFERENCE TO RELATED APPLICATIONS

This application claims the benefit, under 35 U.S.C. §120, as a divisional application of U.S. patent application Ser. No. 12/492,363, filed on Jun. 26, 2009, also entitled "AGGREGATE TRANSPORT CONTROL", now U.S. Pat. No. 8,339,957. The disclosure of U.S. patent application Ser. No. 12/492,363 is incorporated by reference herein in its entirety.

TECHNICAL FIELD

This description relates generally to data communication, such as communicating data in a network.

BACKGROUND

Legacy transport protocols, such as the Transport Control Protocol (TCP), XNS, XTP, DDCMP, ISO TP4 and many others, together with protocols at layers other than the transport layer such as the MAC layer for IEEE 802.3 (known as Ethernet), were originally developed when data traffic volumes, data communication speeds and the number of data connections that could be established with a data network communication device were orders of magnitude less than in current data communication networks. Legacy transport and other protocols, however, continue to be widely used in contemporary data networks. These protocols have been extensively modified over time to make them more suitable for the parameters and capabilities of present data network configurations. However, even with the modifications that have been made to such legacy transport protocols, there are still drawbacks in their performance.

One such drawback of legacy transport protocols is their approach to data traffic congestion. Congestion occurs when the arrival rate of data into shared data buffer resources exceeds the drain rate, or egress rate, of data from the shared resources which in turn leads to the data buffer resources filling to capacity and becoming unable to store additional data. In legacy transport protocols, congestion is the presumed cause when data packet loss (i.e., packets being discarded in the network) is detected. Such data packet loss often occurs due to oversubscription of shared data buffering resources in a network device, such as data routers and/or packet switches, for example. In an oversubscription scenario with high or bursty data arrival rates and limited-size shared buffer resources, it is likely that newly arrived data packets will be discarded because the buffer resources will often be completely filled with data packets that have not yet been drained from the buffer resources.

When such data packet loss is detected in a data network implementing such a legacy transport protocol, a "client" data network device experiencing the congestion (by observing packet loss while sending to a "host" data network device) is configured to reduce its data transmission rates. If the congestion is resolved by this data transmission rate reduction, the data communication rates for all such client devices are gradually increased until they return to normal levels. If the congestion is not resolved, the data communication rates are further reduced until the congestion is resolved.

Such approaches may be inefficient for a number of reasons. A primary reason is inadequate detection and reaction times wherein a burst congestion event may start and finish before packet loss is noticed at the end-points (client or host devices). As a consequence any rate reductions by sending devices are delayed in time compared to the onset of congestion and may be inappropriate if the congestion no longer exists. As another example of inefficiency, packets that are lost (i.e., dropped) due to data congestion are then retransmitted by the originating client device due lack of acknowledgment from the host to the originating client device in response to the earlier transmission. This retransmission may create additional bursty data traffic in the data network, which may further contribute to data congestion. As another example, legacy transport protocols allocate a relatively large transmission window size to every client that has an open data communication channel with the host. Such an approach may result in frequent oversubscription of data buffering resources in the host as a result of transient traffic bursts, especially in network configurations where a large number of client devices (e.g., ten-thousand or more) have open data communication channels established with the host, in part, because the likelihood of simultaneous data traffic bursts by multiple client devices increases proportionally with the number of client devices connected to the host.

SUMMARY

In a first general aspect, an example computer-implemented method includes receiving, at a data network communication device having a shared data buffer for queuing received data, respective data backlog information for a plurality of sending network devices operationally coupled with the data network communication device. The example method according to the first general aspect also includes determining an amount of aggregate data backlog for the data network communication device based on the respective data backlog information. The example method according to the first general aspect further includes comparing the aggregate data backlog amount with a threshold, and, in the event the aggregate data backlog amount is less than or equal to the threshold, allocating, at the data network communication device, respective data transmission windows to the plurality of sending network devices. In this example, respective sizes of the respective data transmission windows are based on the respective data backlog information for each sender. In the event the aggregate data backlog amount is greater than the threshold, the example method in accordance with the first general aspect includes allocating, at the data network communication device, fixed size data transmission windows to the plurality of network sending devices. The example method in accordance with the first general aspect still further includes receiving, at the data network communication device, data from the sending network devices in accordance with at least one of the respective data transmission windows and the fixed size data transmission windows.

In a second general aspect, an example computer-implemented method includes establishing, at a data network communication device having a shared data buffer for queuing received data, respective data communication channels with a plurality of client network devices. The example method in accordance with the second general aspect also includes allocating default size data transmission windows to the plurality of client network devices and monitoring, at the data network communication device, use of the default size data transmission windows by the client network devices based on received data queued in the shared data buffer. The example method in accordance with the second general aspect further includes allocating fixed size data transmission windows to client network devices of the plurality of client network devices that are communicating data at a rate greater than a threshold data rate, where the fixed size data transmission windows are larger than the default size data transmission windows. The example method in accordance with the second general aspect still further includes receiving, at the data network communication device, data from the client network devices in accordance with at least one of the default size data transmission windows and the fixed size data transmission windows.

BRIEF DESCRIPTION OF THE DRAWINGS

FIG. 2 is a flowchart illustrating a method of aggregate transport control in accordance with an example embodiment.

Like reference symbols in the various drawings indicate like elements.

DETAILED DESCRIPTION

Figure 1:
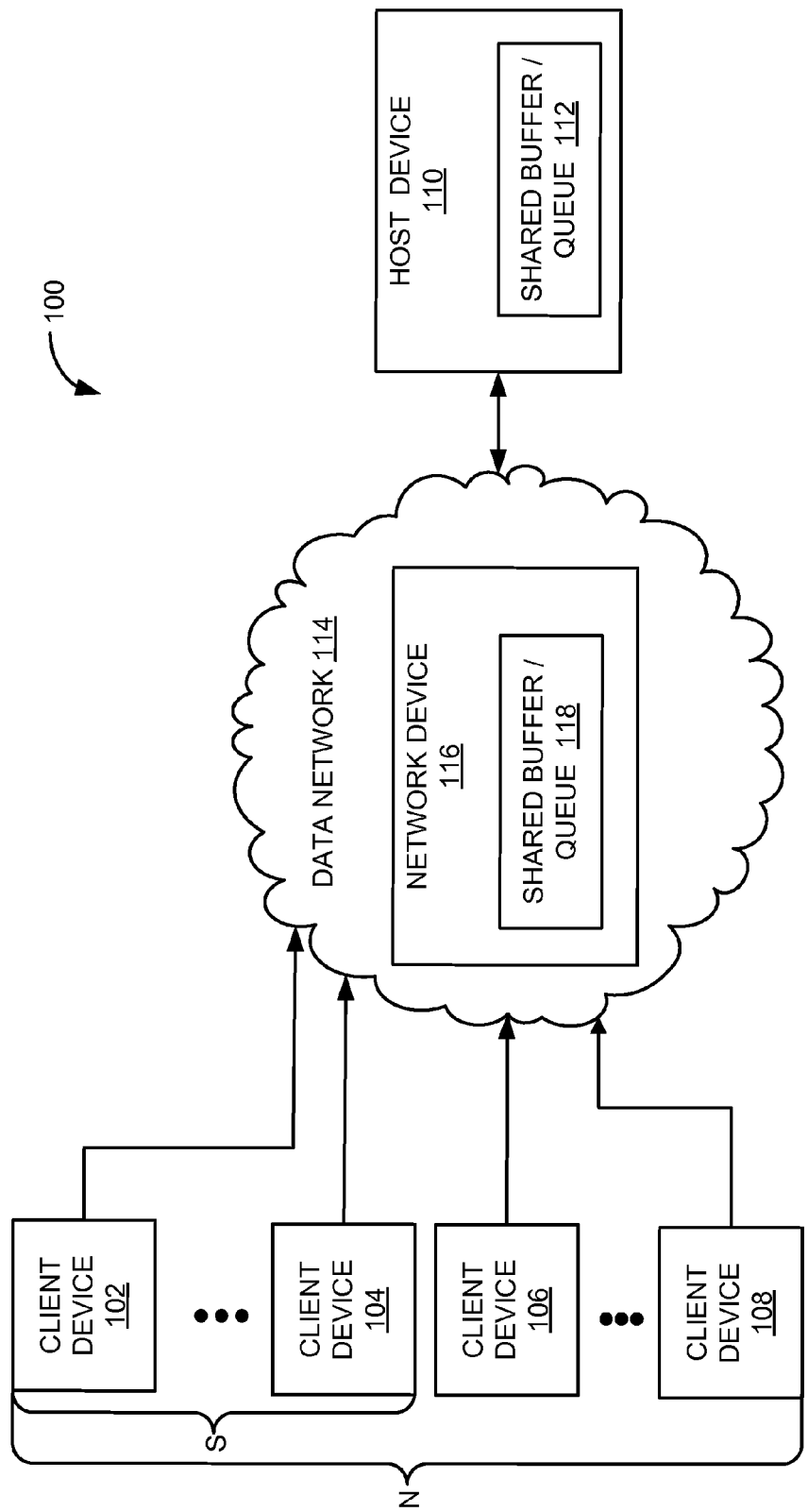
FIG. 1 is a block diagram illustrating a system in accordance with an example embodiment.

FIG. 1 is a block diagram illustrating a system 100 in accordance with an example embodiment. The system 100 shown in FIG. 1 may be used to implement the methods and techniques described herein. For instance, methods for aggregate transport control (ATC), such as described with respect to FIGS. 2-7 may be implemented in the system 100.

The system 100 includes a plurality of client devices 102, 104, 106 and 108. The client devices 102-108 are operationally coupled with a host device 110 via a data network 114. In the system 100, the client devices may buffer packet data for communication to the host device 110, which may be communicated through the data network 114. Also, the client devices 102-108 and the host device 110 may communicate various control messages and information with one another to facilitate communication of packet data from the client devices 102-108 to the host device 110.

In the system 100, each network device (e.g., the client devices 102-108, the network device 116 and/or the host device 110) may have data that is queued for transmission to one or more of the other devices in the system 100. When using transport protocols, as described herein, such queued data is transmitted when the destination host has granted a transmission window to the sending device. Such queued data is generally referred to as "backlogged data," a "data backlog" or simply a "backlog." Accordingly, each device in the system 100 may have its own respective backlog.

In the system 100, the client devices 102-108 may communicate respective amounts corresponding with their backlogs to the host device 110. The host device 110 may then communicate data transmission window allocations to the client devices 102-108. In the system 100, the client devices 102-108 may take any number of forms. For instance, the client devices 102-108 may be network devices (e.g., routers, switches), user computer terminals, wireless data devices, data servers, and Internet servers, among a number of other devices capable of packet data communication.

In the system 100, the host device 110 may be a data network communication device, such as a packet router, a packet switch, or any other appropriate network entity that may receive packet data, buffer that data in a shared data buffer/queue and then retransmit the data. For example, as shown in FIG. 1, the host device 110 includes a shared data buffer/queue 112 (hereafter "queue 112"). The queue 112 may be used to buffer data received from the client devices 102-108, prior to communicating that received data to a data network 114. The data network 114 may include any number of network devices capable of receiving and transmitting packet data, such as in accordance with a transport protocol. For example, packet data may be communicated in the system 100 (and the data network 114) using the Transport Control Protocol (TCP) or the ISO TP4 Protocol, as two examples. Of course other network protocols may be used to communicate packet data in the system 100.

It will be appreciated that the approaches for facilitating data communication between the client devices 102-108 and the host device 110 are described herein by way of example. In other embodiments, the techniques for ATC discussed herein may be implemented between other network devices of the system 100. For instance, ATC may be implemented by any device in the system 100 that includes a shared data buffer/queue and receives data from other devices.

For instance, the network device 116, which includes a shared data buffer/queue 118, may implement such ATC techniques for data communication with the client devices 102-108. In another embodiment, the host device 110 may implement the ATC techniques described herein for data communication between the host device 110 and the network device 116 (e.g., along with any other appropriate devices included in the data network 114 that have data they wish to send to the host device 110). Thus, in the system 100 shown in FIG. 1, the terms host device, network device and client device are given by way of example and any of those devices may act as a sending device (client device) and/or a receiving device (host device) depending on the particular embodiment.

As shown in FIG. 1, the system 100 may include N client devices including the client devices 102-108. In the system 100, the N client devices are operationally coupled with the host device 100 and have respective open data communication channels established with the host device 110. In the examples described herein, at any given time, only a subset S of the N client devices have data buffered awaiting transmission to the host device 110 (where S is a number of the client devices having backlogged data to send to the host device 110). The values of S and N may range from zero to hundreds of thousands or more.

As shown in FIG. 1, the subset S of the client devices 102-108 includes the client devices 102 and 104. Therefore, in the system 100, the client devices 102 and 104 have backlogged data and are actively transmitting packet data to the host device 110 in accordance with a network protocol implemented in the system 100. Further, in this example, the client devices 106 and 108 of the N client devices are idle (i.e., have open communication channels but do not have any queued (backlogged) data to send to the host device 110 and, therefore, are not actively transmitting to the host device 110). It will be appreciated that an idle client device can be added to the subset S of active senders at such time it has backlogged data and an active client device can be removed from the subset S at such time that its data backlog is cleared. Such techniques are described in further detail below with respect to FIGS. 6A and 6B.

Briefly, ATC may be implemented in the system 100 such that each device (the client devices 102-108, the host device 110 and the network device 116) each understands a respective summation of backlog data amounts (respective aggregate backlogs) for data directed to the corresponding device from other devices. The approaches described herein also allow for each device to track a respective summation of allocated data transmission windows (respective aggregate windows) it has granted to other devices in the system 100. Such approaches provide for each device dynamically adjusting the individual data transmission windows it grants (and thus each device's respective aggregate window) in response to changes in the backlog as well as the relationship between the outstanding aggregate window and an objective "do-not-exceed target value" (threshold) for each respective aggregate window.

FIG. 2 is flowchart illustrating an example method 200 for ATC that may be implemented in the system 100. Accordingly, for purpose of illustration, the method 200 illustrated in FIG. 2 will also be described with further reference to FIG. 1. The method 200, however, may be implemented using any appropriate network configuration and using any appropriate network protocol for communicating packet data between client devices and a host device.

In the network 200, the subset S of actively sending client devices (including the client devices 102-104) may each communicate, to the host device 110, a respective amount of data backlog they have buffered for pending transmission to the host device 110. The actively sending client devices (subset S) may communicate their respective backlog information in a number of fashions. For instance, the backlog information may be included in data packets sent from a respective client device to the host device 110. As the amount of data backlog changes (i.e., increases due to additional data waiting to be sent or decreases due to data being removed from a data buffer of the client device and communicated to the host device 110), the backlog information that the client device includes in data packets will correspondingly change so as to provide accurate backlog information to the host device 110. Alternatively, the client devices could communicate their respective backlog information in control messages. Such an approach may be referred to as out of band communication, as the backlog information is not communicated as part of the respective data streams from the client devices to the host device 110.

At block 205, the host device 110 receives the respective data backlog information from each of the active client devices of the subset S. At block 210, the method 200 includes the host device 110 determining an amount of aggregate data backlog (e.g., data waiting to be sent to the host device 110 by the subset S of client devices). The host device 110 may determine the amount of aggregate data backlog based on the respective data backlog information received from the actively sending client devices (e.g., the client devices 102-104). For example, the host device 110 may determine the amount of aggregate data backlog as B=SUM($b_i$), for i=1 to S, where B is the amount of aggregate data backlog and the individual values of $b_i$ are respective data backlog amounts for each of the actively sending client devices of the subset S. In a simple example, where the two sending client devices 102 and 104 shown in FIG. 1 make up the subset S of active sending client devices, B may be calculated as B=$b_1$+$b_2$, where $b_1$ is the amount of data backlog of the client device 102 to be sent to the host device 110 and $b_2$ is the amount of data backlog of the client device 104 to be sent to the host device 110.

At block 215, the method 200 includes comparing the aggregate data backlog amount with a threshold T to determine if the aggregate data backlog is less than or equal to the threshold T. In the method 200, the threshold may be a multiple of a size of the queue 112. For instance, if the queue 112 has a size Q, the threshold T may be expressed as T=k·Q, where k is the multiplier. In example embodiment, k may be set as k=1.5, which would set the threshold T at one and a half times the size Q of the queue 112. In the method 200, the host device 110 may allocate data transmission windows to the actively sending client devices 102-104 only when an aggregate allocated transmission window size W is less than or equal to the threshold T.

In the case where k=1, it would be very unlikely for the queue 112 to oversubscribe unless the host device 110 was not able to communicate data buffered in the queue 112 to the data network 114. Specifically, because the queue 112 in the example system 100 transmits data to the data network 114 as it also receives data from the actively sending client devices 102-104, the drain rate of the queue 112 would prevent the queue 112 from becoming oversubscribed in such an approach.

Accordingly, in order to use the data buffering resources of the queue 112 more efficiently, k may be set to be k>1. In an example embodiment, k may be set to a fixed value of k=2. Such an approach may account for the drain rate of the queue 112. However, in cases where a very high volume of data traffic is being sent to the host device 110 by the actively sending client devices of the subset S, the queue 112 may become oversubscribed in such a situation. In such arrangement, a smaller value of k may prevent oversubscription of the queue 112.

In other embodiments, k may be an adaptive variable, where the value of k depends on one or more attributes of the system 100. For instance, the value of k may depend on the number S of actively sending client devices, the number N of client devices with open data communication channels with the host device 110, and/or a volume of data traffic received at the host device 110 from the actively sending client devices 102-104.

In such an approach, as the number S of actively sending client devices increases and/or the number N of client devices with open data communication channels with the host device 110 increases, the value of k may be reduced to account for the associated higher probability of large bursts of data traffic associated with the higher number of client devices that are sending, or may send data to the host device 110. Likewise, as the number S of actively sending client devices decreases and/or the number N of client devices with open data communication channels with the host device 110 decreases, the value of k may be increased to account for the associated lower probability of large bursts of data traffic associated with the lower number of client devices that are sending, or may send data to the host device 110.

Similarly, as the volume of data received from the actively sending client devices 102-104 increases, the value of k may be reduced to account for the higher volume of data, so as to reduce the likelihood of over subscription of the queue 112. Likewise, as the volume of data received from the actively sending client devices 102-104 decreases, k may be increased to account for the lower volume of data, so as to more effectively utilize the data buffering resources of the queue 112.

If the aggregate data backlog amount B is less than or equal to the threshold T at block 215, this indicates that the aggregate data backlog amount B of data waiting to be sent to the host device 110 by the actively sending client devices 102-104 is less then the threshold T. In this situation, as long as the value of k is appropriate based on the configuration of the network and/or a volume of traffic being communicated to the host device 110, the probability of oversubscription of the queue 112 is low.

If the aggregate data backlog amount B is less than the threshold T at block 215, the method 200 continues at block 220. At block 220, the host device 110 may allocate respective date transmission windows to each of the sending devices 102-104 that are equal to their respective data backlog amounts. However, if the aggregate data backlog amount B is greater than the threshold T at block 215, allocating data transmission windows to the actively sending client devices of the subset S in this fashion is likely to result in oversubscription of the queue 112 due to the fact that the amount of aggregate data backlog B exceeds the threshold T and a traffic burst including the amount of aggregate data backlog B may overflow the queue 112 and result in data loss.

In the method 200, when the amount of the aggregate data backlog B exceeds the threshold T at block 215, the host device 110 may allocate respective data transmission windows to the actively sending client devices 102-104 based on a fixed size data transmission window while an aggregate allocated data transmission window size W is less than the threshold T. The method 200, at block 225, includes determining a size W of an aggregate allocated data transmission window for the host device 110 and comparing W with the threshold T. In other embodiments, W may be compared with a different threshold amount at block 225.

In the method 200, the aggregate allocated window size W may be determined by computing a sum of respective sizes of allocated and unused data transmission windows that have been allocated to each of the sending network devices 102-104 by the host device 110. For instance the aggregate allocated window size W may be calculated as $W=SUM(w_i)$, for i=1 to S, where W is the aggregate allocated window size and the individual values of $w_i$ are respective sizes of allocated and unused data transmission windows for each of the actively sending client devices of the subset S. Using the same simple example discussed above with respect to calculating the amount of aggregate data backlog B (i.e., where the two sending client devices 102 and 104 shown in FIG. 1 make up the subset S of active sending client device), W may be calculated as $W=w_1+w_2$. In this example, $w_1$ is a size of an unused data transmission window that has been allocated to the client device 102 by the host device 110 and $b_2$ is a size of an unused data transmission window that has been allocated to the client device 104 by the host device 110. Methods for tracking the aggregate allocated data transmission window size W (e.g., as data transmission windows allocated the actively sending client devices 102-104 are used and new data transmission windows are allocated) are discussed in further detail below.

In the method 200, when the aggregate allocated window size W is less than the threshold T at block 225, the method 200 continues at block 230. In like fashion as was discussed briefly above, in the method 200, at block 230, the host device 110 of the system 100 may allocate data transmission windows to the subset S of actively sending client devices based on a fixed size data transmission window when the aggregate data backlog amount B is greater than the threshold T. In an example embodiment, the fixed size data transmission window may consist of size A packets. The value of A may vary depending on the particular embodiment. Also, in certain embodiments, the value of A may be weighted based on a type of data traffic a particular client device is sending. For instance, actively sending client devices of the subset S that are sending high priority (high Class of Service) data traffic or latency-sensitive data traffic to the host device 110 may, at block 230, receive data transmission window allocations that are larger than A packets, such of a size A multiplied by a weighting factor F, where F is based, at least in part, on the type of data traffic the data transmission window is being allocated for.

At block 230, the host device 110 may allocate data transmission windows (e.g., of size A packets and/or of size F·A packets) while the aggregate allocated data transmission window size W is less than the threshold T. In the method 200, when the allocated data transmission window size W is greater than the threshold T, the host device 110 discontinues allocating data transmission windows to the actively sending client devices 102-104 until the allocated data transmission window size W is reduced to a value below the threshold T (i.e., when previously allocated data transmission windows are used, thus reducing the value of W). When the allocated data transmission window size W is reduced to a value below the threshold T, the host device 110, in the method 200, resumes allocating data transmission windows of size A packets and/or of size F·A packets to the actively sending client devices 102-104.

The data transmission window allocations may be done, for example, based on a fixed sequence so that each sending client device receives a data transmission window allocation in turn. Depending on the particular embodiment, various policies may be implemented as part of the data transmission window allocation process. For instance, sending client devices that are communicating time critical data (e.g., data having a high COS designation) may be grouped together in a priority group and a preferential window allocation policy may be used for data transmission window allocations for that group.

In the method 200, if the amount of aggregate data backlog B is reduced below the threshold T, the host 100 resumes allocating data transmission windows as discussed above with respect to block 220 (e.g., respective date transmission windows are allocated to each of the sending devices 102-104 that are of a size equal to their respective data backlog amounts $b_i$).

As shown in FIG. 2, the method 200 may proceed to block 235 from blocks 220, 225 or 230. At block 235, the method 200 includes receiving data from the sending network devices 102-104 at the host device 110. In the method 200, the data is received from the client devices in accordance with data transmission windows that are allocated at block 220 and/or block 230. The particular window allocations depend, at least in part, on the configuration of the system 100 (e.g., which may be used to determine k), the amount of aggregate data backlog B (e.g., whether B is less than, equal to or greater than the threshold T) and/or the aggregate allocated data transmission window size W (e.g., whether W is less than, equal to or greater than the threshold T). The data received at block 235 may include updated backlog information for the client devices of the system 100. In the method 200, after block 235, the method 200 may return to block 210 and, again, determine an aggregate data backlog.

Figures 3A, 3B:
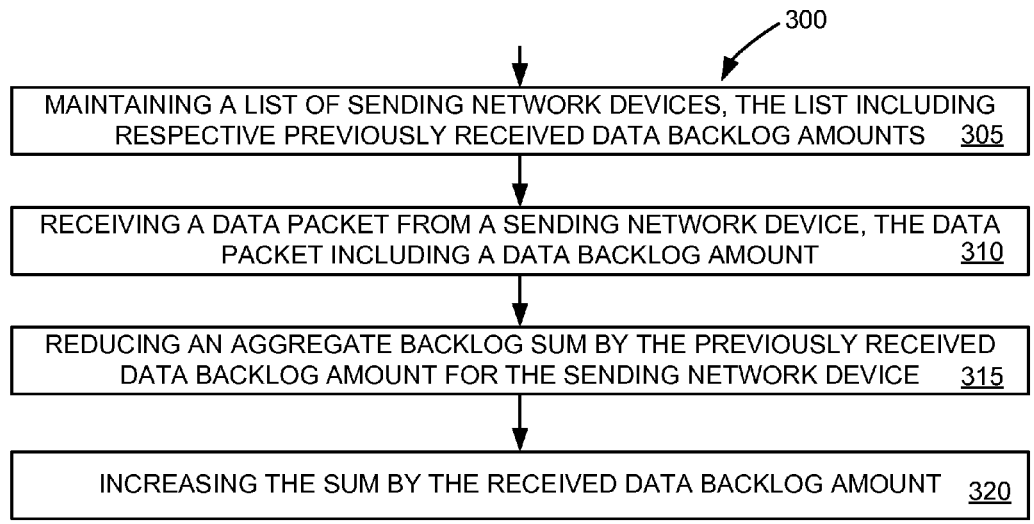
FIG. 3A is a flowchart illustrating a method of determining an aggregate data backlog in accordance with an example embodiment.
FIG. 3B is a drawing illustrating a table in accordance with an example embodiment that may be implemented in the method illustrated in FIG.3A.

FIG. 3A is a flow chart illustrating a method 300 for adjusting the aggregate data backlog amount B. As with the method 200, the method 300 may be implemented in the system 100. Therefore, for purposes of illustration, the method 300 will be described with further reference to FIG. 1.

In the method 300, an initial value of the aggregate data backlog amount B may be determined in like fashion as was discussed above with respect to block 210 of FIG. 2. This initial value of B, in the method 300, may then be modified based on respective updated data backlog information (amounts) received from the actively sending client devices and previously received data backlog information from the actively sending client devices, such as in the fashion discussed below.

At block 305, the method 300 includes maintaining a list of the sending network devices 102-104, where the sending network devices each have a respective amount of data backlog to be sent to the host device 110. An example embodiment of such a list is illustrated in FIG. 3B and described below.

In the system 100, for example, as new data is buffered at the client devices, e.g., 102-104, and data is communicated from those client devices, the respective amount of data backlog for each of the client devices may change and, in turn, the amount of aggregate data backlog B will change as well. In the method 300, the value of B is updated when a client device sends an updated data backlog amount to the host device 110. In the method 300, it is assumed that each of the sending client devices 102-104 has sent a previous data backlog amount to the host device 110 and a value of the aggregate data backlog amount B has been calculated based on the previously sent data backlog amounts, which are stored in the list, such as described above with respect to block 305 and discussed in further detail below.

At block 310, the method 300 includes receiving a data packet from one of the sending network devices 102-104, where the data packet includes a new data backlog amount for the sending client device. At block 315, the previously received data backlog amount for the sending client device associated with the new data backlog amount is subtracted from the value of B. At block 320, the new data backlog amount is added to B. After executing the operations of block 315 and 320, which can be performed in either order, the value of B in the host device 100 is up to date with the most recent backlog information from the sending client devices.

Depending on the particular embodiment, one or more processors or processor cores may perform the operations at blocks 315 and 320. In embodiments using multiple processors or processor cores, the operations at blocks 315 and 320 may be done in parallel for a single device in the system 100 or for multiple devices in the system 100. Such an approach may result improved performance as compared to approaches where the operations at blocks 315 and 320 are performed serially.

The host device 110 may implement the method 300 each time an updated data backlog amount is received from a sending client device. Updating the value of B in this fashion allows the host device 110 to have an accurate assessment of the amount of aggregate data backlog B in the system 100 readily available for use in implementing ATC, such as described herein. For instance, having the updated value of B, the host device 110 can make appropriate decisions, based on the updated value of B, regarding data transmission window allocation, as discussed herein, and/or modification of the threshold T by modulating the value of k, such as was previously discussed.

FIG. 3B is a diagram illustrating a table (list) 350 in accordance with an example embodiment. The list 350 may be used in conjunction with the method 300 illustrated in FIG. 3a and discussed above. As shown in FIG. 3B, the list 350 lists each of the actively sending client devices 102-104 and their respective last sent data backlog amounts. In the list 350, a previous data backlog amount for the client device 102 is listed as 750 MB, and a previous data backlog amount for the client device 104 is listed at 400 MB.

The previous data backlog amounts shown in FIG. 3B may be used to update an aggregate data backlog amount B, such as in the fashion discussed above with respect to FIG. 3A. For instance, if a new data backlog amount of 800 MB is received for the client device 102, the value of the aggregate data backlog amount B may be updated by subtracting the 750 MB value (obtained from the list 350) and then adding the 800 MB value (the new data backlog amount received from the client device 102). After the value of B is updated, the 750 MB value may be discarded, and the 800 MB may be stored in the list 350 as a previous data backlog amount for the client device 102.

Figure 4:
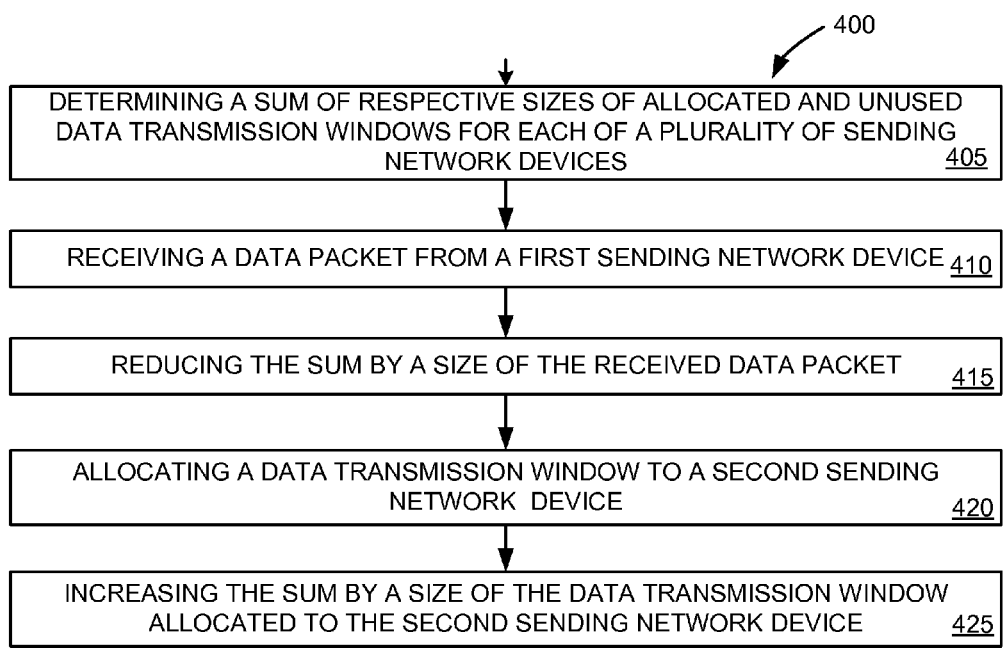
FIG. 4 is a flowchart illustrating a method of determining and updating an aggregate allocated data transmission window size in accordance with an example embodiment.

FIG. 4 is a flowchart illustrating a method 400 of determining and updating an aggregate allocated data transmission window size W. As with the methods 200 and 300, the method 400 illustrated in FIG. 4 may be implemented in the system 100. Accordingly, for purposes of illustration, the method 400 will be described with further reference to the system 100 illustrated in FIG. 1.

In the method 400, an initial value of the aggregate allocated data transmission window size W may be determined in like fashion as was discussed above with respect to block 225 of FIG. 2. In the method 300, this initial value of W may then be updated based on respective data transmission window allocations for the actively sending client devices being used (i.e., transmitting data to the host device 110) and new data transmission window allocations being made to the sending client devices 102-104, such as in the fashion described below.

The method 400, when implemented in the system 100, includes, at block 405, determining an aggregate allocated data transmission window size W for the host device 110 (e.g., a data network communication device). In an example embodiment, an initial value of the aggregate allocated data transmission window size W may be determined in similar fashion as was discussed above with respect to block 225 of FIG. 2. For instance, an initial value for W by be determined by calculating a sum of respective sizes of allocated and unused data transmission windows $w_i$ for each of the sending network devices.

At block 410, the method 400 includes receiving a data packet from a first one of the sending network devices, where the packet has a size of $a_i$, i=1 to S and i corresponds with the sending client device, in like fashion as discussed above. Receiving the packet of size in the method 400, indicates to the host device 110 that the corresponding sending client device has used, at least part of, a data transmission window that was previously allocated to it and furthermore that said data packet is unlikely to be retransmitted by the sending device. Since the sending client device has used a portion (and maybe all) of its data transmission window allocation, at block 415, the size a, of the received packet is subtracted from the aggregate data transmission window size W, as that portion of the aggregate data transmission window W for the host device 110 is once again available for allocation to a sending client device.

In the method 400, at block 420, the host device 110 may then allocate a data transmission window to one of the sending client devices, where the data transmission window allocation is of a size $w_i$. Depending on the particular circumstances, the size $a_i$ may or may not equal the size $w_i$ (e.g., whether or not the amount of aggregate data backlog B is greater than the threshold T). The sending client device that receives the data transmission window allocation of size $w_i$ may be the same sending client device associated with received packet of size $a_i$. Alternatively, the sending client device receiving the data transmission window allocation of size $w_i$ may be a different client sending device. When the host device 110 allocates the data transmission window of size $w_i$, the value of W is increased by the value of $w_i$ to indicate that the allocation has been made and to accurately maintain the value W in the host device 110.

The host device 110 may implement the operation of blocks 415 each time a data packet is received at the host device 110 and, likewise, may implement the operation of block 425 each time a data transmission window is allocated by the host device 110. Updating the value of W in this fashion allows the host device 110 to have an accurate assessment of the size of the aggregate data transmission window allocation W for the system 100 (and the host device 110) readily available for use in implementing ATC, as described herein. For instance, having the updated value of W, the host device 110 can make appropriate decisions, based on the updated value of W, regarding data transmission window allocation, as discussed herein, and/or modification of the threshold T by modulating the value of k, such as was previously discussed.

Figure 5A:
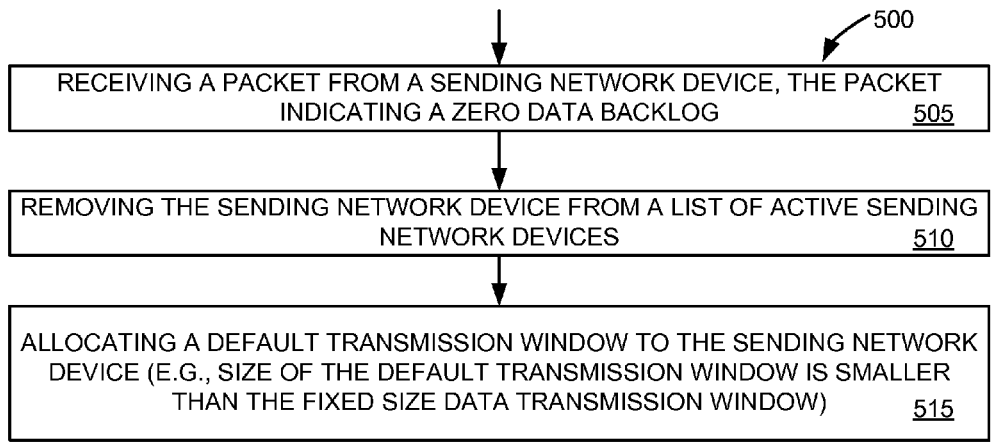
FIG. 5A is a flowchart illustrating a method of allocating data transmission windows in accordance with an example embodiment.

FIG. 5A is a flowchart illustrating a method 500 of allocating data transmission windows in accordance with an example embodiment. As with the methods 200, 300 and 400, the method 500 illustrated in FIG. 5A may be implemented in the system 100. Accordingly, for purposes of illustration, the method 500 will be described with further reference to the system 100 illustrated in FIG. 1.

The method 500 of FIG. 5A illustrates removing a client device 102-104 from the subset S of actively sending client devices in the system 100. For instance, client device 102 may be removed from the subset S of actively sending client devices when a data backlog of the client device 102 is cleared and the client device 102 no longer has queued data waiting to be sent to the host device 110.

At block 505, the host device 110 may receive a data packet from the client device 102, where the packet indicates an updated data backlog of zero for the client device 102. This indicates to the host device 110 that the client device 102 will no longer be actively sending packet data. Accordingly, at block 510 of the method 500, the host device 110 may remove the client device 102 from a list of actively sending client devices, such as the list illustrated in FIG. 3B and discussed above. The client device 102 may be said to be idle (not actively transmitting), though it may maintain an open data connection with the host device 110.

While the client device 102 is not actively sending packet data to the host device 110 at this point, the client device 102 may generate and/or receive data at a later time that it wishes to communicate to the host device 110. Accordingly, the client device 110 should be able to indicate to the host device 110 when it again has a non-zero backlog of data to send. Accordingly, the host device 110, at block 515, will continue to provide a default data transmission window allocation to the client device 102 (e.g., an allocation of at least one packet). Such an approach may be used for each of the client devices 102-108 that is not a member of the subset S of actively sending client devices (e.g., idle client devices).

Figure 5B:
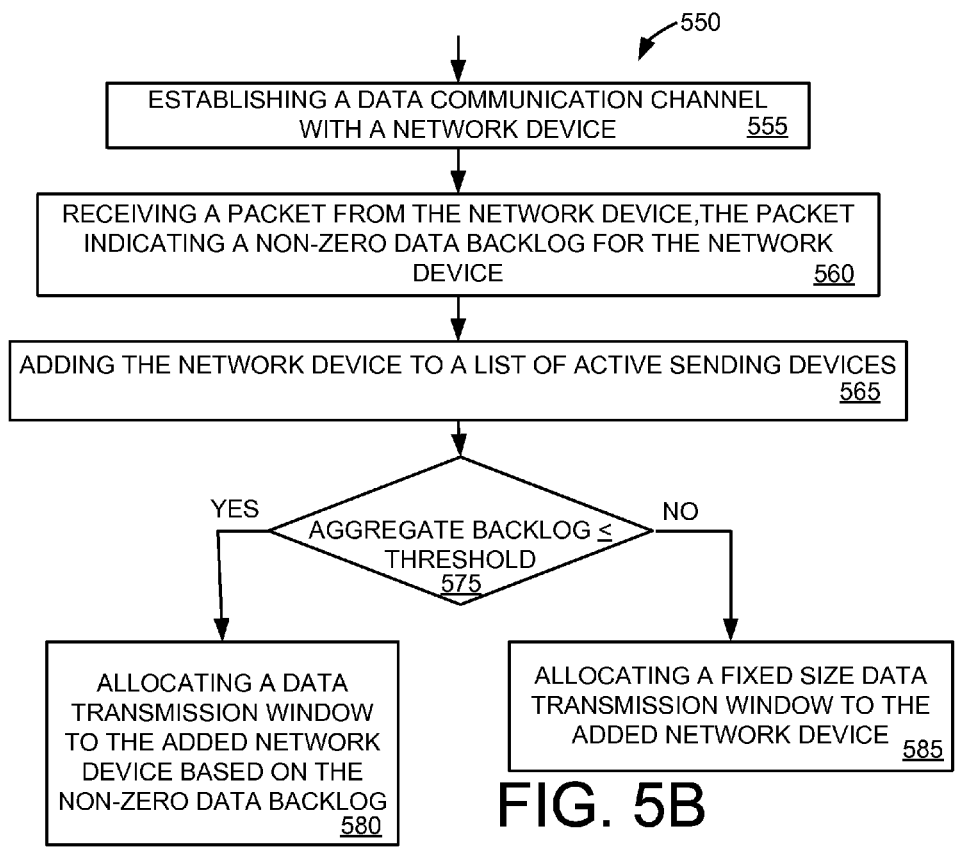
FIG. 5B is a flowchart illustrating another method of allocating data transmission windows in accordance with an example embodiment.

FIG. 5B is a flowchart illustrating another method 550 of allocating data transmission windows in accordance with an example embodiment. As with the methods 200, 300, 400 and 500, the method 550 illustrated in FIG. 5B may be implemented in the system 100. Accordingly, for purposes of illustration, the method 550 will be described with further reference to the system 100 illustrated in FIG. 1.

The method 550 illustrates adding a client device 102-108 to the subset S of actively sending client devices in the system 100. For instance, the client device 102, which was previously removed from the list of actively sending client devices, may receive data from another network device or self-generate data that is to be communicated to the host device 110. Alternatively, a new client device that is not in operative communication with the host device 110 may have data that it wishes to send to the host device 110. In this example, it will be assumed that the client device 108 does not initially have an open data communication connection with the host device 110.

At block 555 of the method 550, the host device 110 may establish a transport protocol communication channel with the client device 108. Such a communication channel may be established, for example, in response to a registration request sent from the client device 108 to the host device 110. After the data (transport) communication channel is open between the client device 108 and the host device 110, the host device 110 may allocate default data transmission windows to the client device 108, such as in the fashion described above with respect to FIG. 5A, for example. At block 560 of the method 500, the client device 108 may use its default data transmission window allocation to provide an indication to the host device 110 that the client device 108 has a non-zero backlog of data to be sent to the host device 110, where the non-zero backlog is indicated in a packet sent from the client device 108 to the host device 110.

At block 565 of the method 550, the host device 100 may add the client device 108 to a list of actively sending client devices, such as the list 350, which was discussed above with respect to FIG. 3B. The host 110 may also store the non-zero data backlog amount provided by the client device 108 at block 560 in the list as a previous data backlog amount. The non-zero data backlog information provided by the client device 108 may also be used to update an aggregate data backlog amount B for the network 110.

At block 570 the aggregate backlog B is compared with the threshold T. If B is less than T at block 575, the method 550 continues to block 580. If B is greater than T at block 575, the method 500 continues to block 585. At blocks 580 and 585, data transmission windows may be allocated to the client device 108 using the techniques described herein. For instance, if the aggregate data backlog amount B is less than or equal to the threshold T, the host device 110, at block 580, may allocate a data transmission window to the client device 108 that is equal to its backlog. However, in the event the aggregate data backlog amount B is greater than T at block 575, the host device 110, at block 585, may allocate data transmission windows to the client device 108 based on a fixed size data transmission window, in like fashion as discussed above with respect to FIG. 2, for example.

Figure 6:
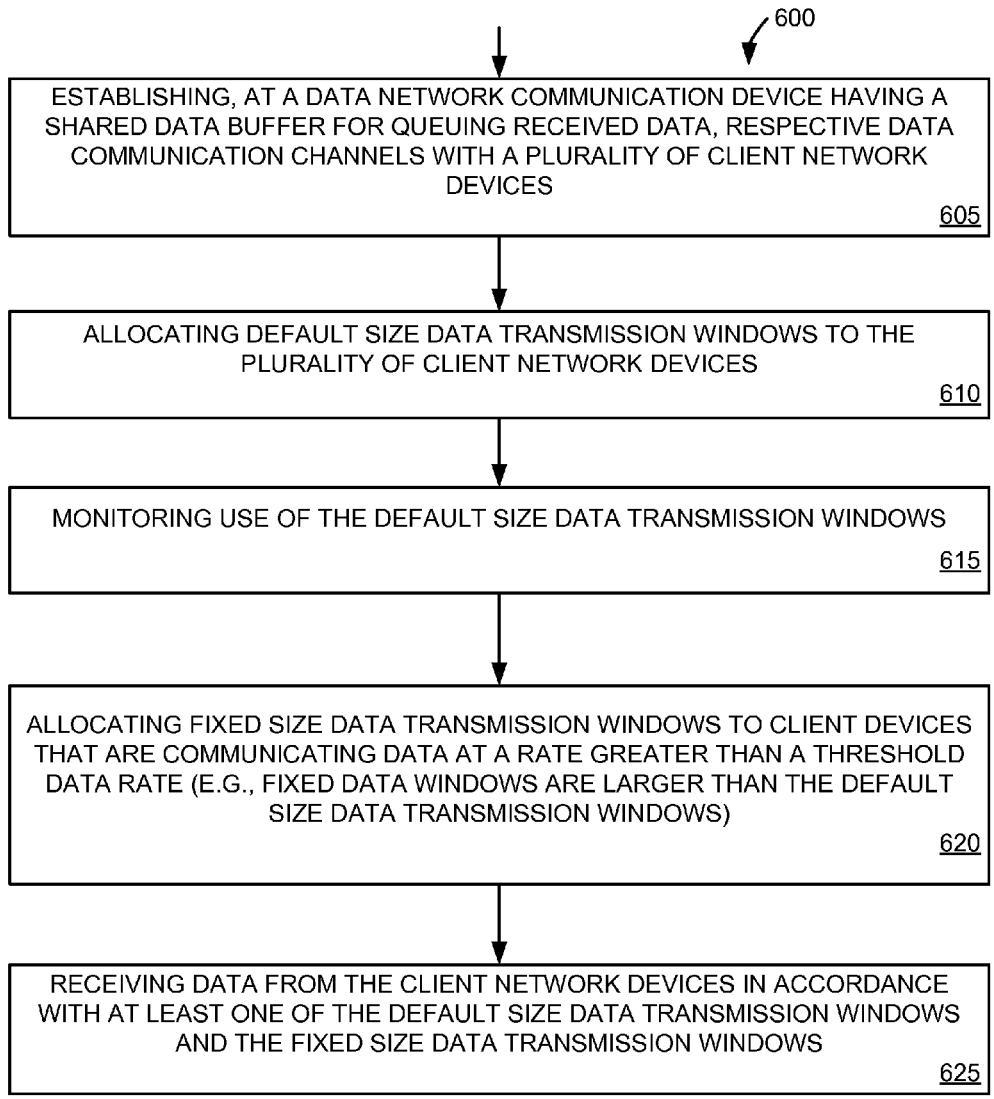
FIG. 6 is a flowchart illustrating a method of aggregate transport control in accordance with an example embodiment.

FIG. 6 is a flowchart illustrating a method 600 of aggregate transport control in accordance with an example embodiment. As with the methods 200, 300, 400, 500 and 550, the method 600 illustrated in FIG. 6 may be implemented in the system 100. Accordingly, for purposes of illustration, the method 600 will be described with further reference to the system 100 illustrated in FIG. 1.

The method 600 is a method of implementing ATC in a network where the client devices 102-108 do not provide data backlog information to the host device 110. For the method 600, when implemented in the system 100, the method includes, at block 605, establishing, at a data network communication device having a shared data buffer (the queue 112) for queuing received data (the host device 110), respective data communication channels with a plurality of client network devices (the client devices 102-108). In the method 600, each of the communication channels would initially be considered to be idle.

At block 610, the method includes the host device 110 allocating default size data transmission windows to the client devices 102-108. The client devices 102-108 may use the default allocation to begin sending any respective data backlogs they have. At block 615, the host device 110 monitors use of the default size data transmission windows by the client devices 102-108. This monitoring may be based on received data queued in the shared data buffer and the respective client devices 102-108 that are associated with the queued data.

At block 620, based on the monitoring at block 615, the host device 110 continues to allocate default size data transmission windows when an aggregate window allocation of the host device 110 is less than or equal to a data transmission window allocation threshold. In the method 600, the data transmission window allocation threshold is based on the size Q of the queue 112. Also at block 620, in the event the aggregate window allocation of the host device 110 is less than or equal to the data transmission window allocation threshold, the host device 110 allocates data transmission windows to the client devices based on a fixed size data transmission window allocation, such as discussed above with respect to FIG. 2, for example. As with other techniques described herein, data transmission window allocation in the method 600 may be weighted based on class of service, for example.

At block 625, the method 600 includes receiving, at the host device 110, data from the client devices 102-108. In the method 600, the data received from the client devices 102-108 is transmitted to the host device 110 in accordance with default size data transmission window allocations and/or fixed size based data transmission window allocations, depending on the particular network configuration and amount of data traffic in the system 100. In the method 600, as well as the other methods described herein, fixed size data transmission windows are larger than default size data transmission windows.

Figure 7:
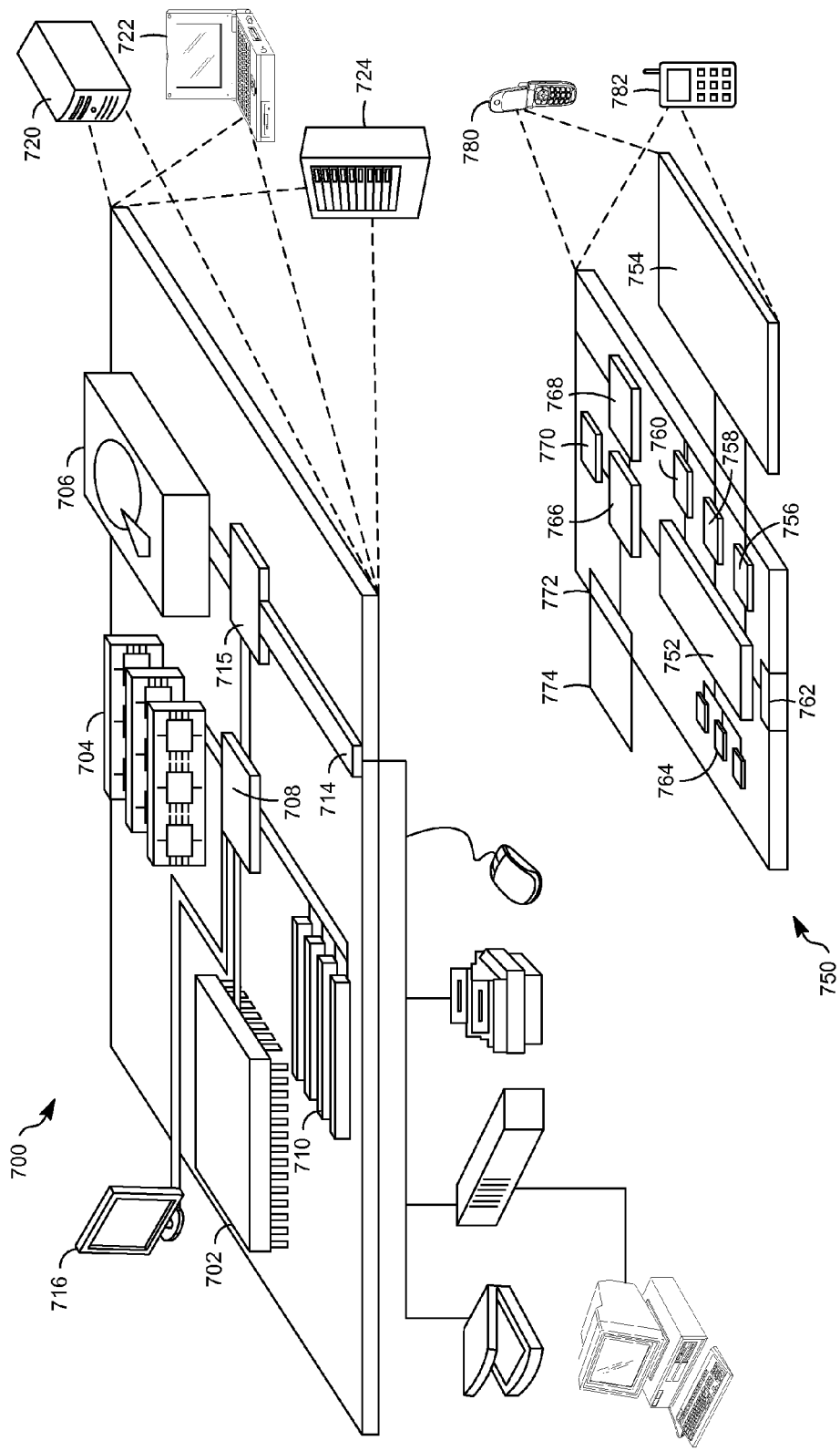
FIG. 7 is a block diagram illustrating an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    establishing, at a data network communication device having a shared data buffer for queuing received data, respective data communication channels with a plurality of client network devices;
    allocating first size data transmission windows to the plurality of client network devices;
    monitoring, at the data network communication device, use of the first size data transmission windows by the client network devices based on received data queued in the shared data buffer;
    allocating, based on the monitoring of the use of the first size data transmission windows, respective second size data transmission windows to client network devices of the plurality of client network devices that are communicating data at a rate greater than a threshold data rate, wherein the respective second size data transmission windows are larger than the first size data transmission windows; and
    receiving, at the data network communication device, data from the client network devices in accordance with at least one of the first size data transmission windows and the respective second size data transmission windows.

2. The computer-implemented method of claim 1, wherein a size of the respective second size data transmission window allocated to a one of the client network devices is weighted based on a class of service of data traffic received from the one of the client network devices.

3. The computer-implemented method of claim 1, wherein:
    allocating the first size data transmission windows comprises, allocating the first size data transmission windows only when an aggregate window allocation of the data network communication device is less than or equal to a data transmission window allocation threshold; and
    allocating the respective second size data transmission windows comprises, allocating the respective second size data transmission windows only when the aggregate window allocation is less than or equal to the data transmission window allocation threshold.

4. The computer-implemented method of claim 3, wherein the data transmission window allocation threshold is based on a size of the shared data buffer.

5. The computer-implemented method of claim 1, wherein establishing the respective data communication channels includes establishing the respective data communication channels with an idle status.

6. A non-transitory recordable storage medium having recorded and stored thereon instructions that, when executed by a computing device, perform the actions of:
    establishing, at a data network communication device having a shared data buffer for queuing received data, respective data communication channels with a plurality of client network devices;
    allocating first size data transmission windows to the plurality of client network devices;
    monitoring, at the data network communication device, use of the first size data transmission windows by the client network devices based on received data queued in the shared data buffer;
    allocating, based on the monitoring of the use of the first size data transmission windows, respective second size data transmission windows to client network devices of the plurality of client network devices that are communicating data at a rate greater than a threshold data rate, wherein the respective second size data transmission windows are larger than the first size data transmission windows; and
    receiving, at the data network communication device, data from the client network devices in accordance with at least one of the first size data transmission windows and the respective second size data transmission windows.

7. The non-transitory recordable storage medium of claim 6, wherein a size of the respective second size data transmission window allocated to a one of the client network devices is weighted based on a class of service of data traffic received from the one of the client network devices.

8. The non-transitory recordable storage medium of claim 6, wherein:
    allocating the first size data transmission windows comprises, allocating the first size data transmission windows only when an aggregate window allocation of the data network communication device is less than or equal to a data transmission window allocation threshold; and
    allocating the respective second size data transmission windows comprises, allocating the respective second size data transmission windows only when the aggregate window allocation is less than or equal to the data transmission window allocation threshold.

9. The non-transitory recordable storage medium of claim 8, wherein the data transmission window allocation threshold is based on a size of the shared data buffer.

10. The non-transitory recordable storage medium of claim 6, wherein establishing the respective data communication channels includes establishing the respective data communication channels with an idle status.

11. A data network communication device comprising:
    a processor; and
    program storage memory operationally coupled with the processor, the program storage memory having instructions stored thereon that, when executed by the processor, provide for:
    establishing, at the data network communication device having a shared data buffer for queuing received data, respective data communication channels with a plurality of client network devices;
    allocating first size data transmission windows to the plurality of client network devices;
    monitoring, at the data network communication device, use of the first size data transmission windows by the client network devices based on received data queued in the shared data buffer;
    allocating, based on the monitoring of the use of the first size data transmission windows, respective second size data transmission windows to client network devices of the plurality of client network devices that are communicating data at a rate greater than a threshold data rate, wherein the respective second size data transmission windows are larger than the first size data transmission windows; and receiving, at the data network communication device, data from the client network devices in accordance with at least one of the first size data transmission windows and the respective second size data transmission windows.

12. The data network communication device of claim 11, wherein a size of the respective second size data transmission window allocated to a one of the client network devices is weighted based on a class of service of data traffic received from the one of the client network devices.

13. The data network communication device of claim 11, wherein:

allocating the first size data transmission windows comprises, allocating the first size data transmission windows only when an aggregate window allocation of the data network communication device is less than or equal to a data transmission window allocation threshold; and allocating the respective second size data transmission windows comprises, allocating the respective second size data transmission windows only when the aggregate window allocation is less than or equal to the data transmission window allocation threshold.

14. The data network communication device of claim 13, wherein the data transmission window allocation threshold is based on a size of the shared data buffer.

15. The data network communication device of claim 11, wherein establishing the respective data communication channels includes establishing the respective data communication channels with an idle status.

* * * * *